Figure 1:
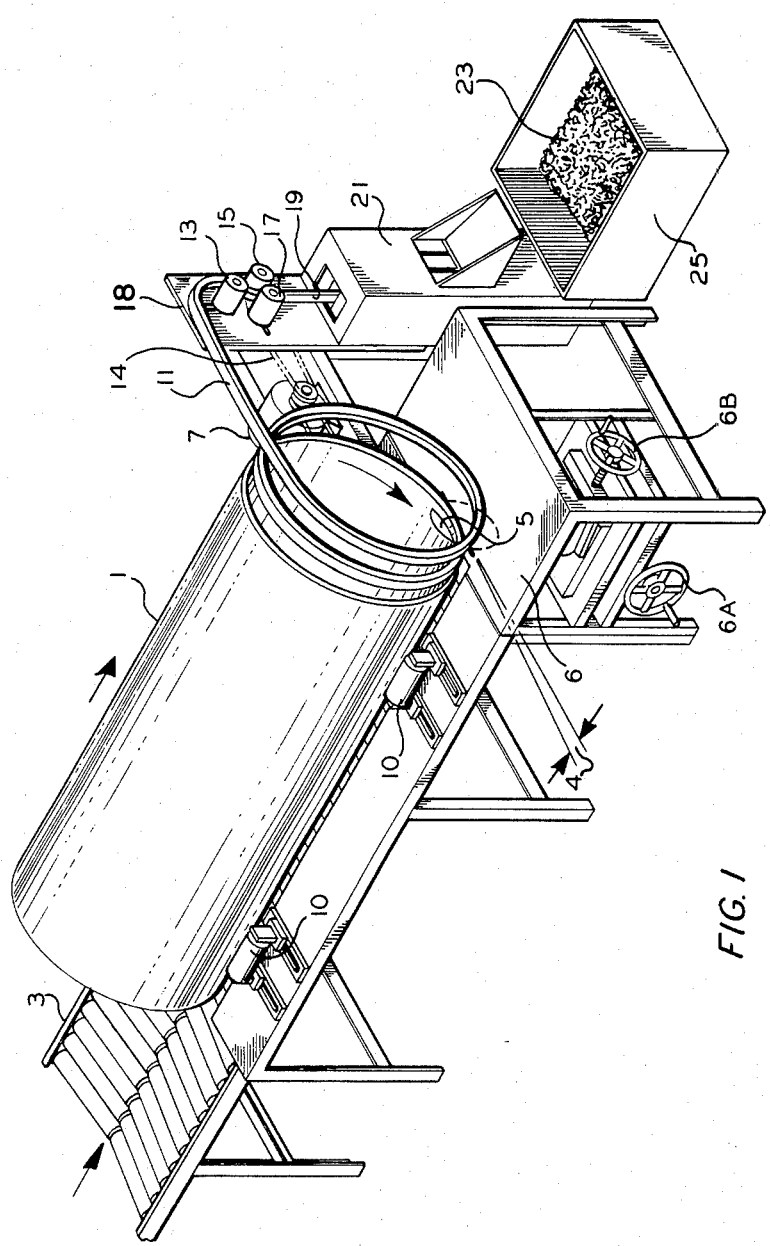

United States Patent [19]

Parker, Jr.

[11] Patent Number: 4,499,037

[45] Date of Patent: Feb. 12, 1985

[54] METHOD FOR THE RECOVERY OF THERMOPLASTIC FROM PIPING FOR REPROCESSING

[75] Inventor: Ray A. Parker, Jr., Brownwood, Tex.

[73] Assignee: Phillips Petroleum Company, Bartlesville, Okla.

[21] Appl. No.: 504,542

[22] Filed: Jun. 15, 1983

Related U.S. Application Data

[62] Division of Ser. No. 281,755, Jul. 9, 1981, Pat. No. 4,408,976.

[51] Int. Cl.³ .............................................. B29C 29/00
[52] U.S. Cl. .................................... 264/37; 264/140; 264/145; 264/157
[58] Field of Search .................. 264/36, 37, 140, 145, 264/158, 159, 157

[56] References Cited

U.S. PATENT DOCUMENTS

| | | | |
|---|---|---|---|
| 2,313,986 | 3/1943 | Brown | 82/47 |
| 3,360,414 | 12/1967 | Tuthill | 264/145 |
| 3,557,268 | 1/1971 | Beretta et al. | 264/145 |
| 4,141,773 | 2/1979 | Keuchel | 264/145 |
| 4,235,579 | 11/1980 | Kurz et al. | 264/37 |
| 4,287,147 | 9/1981 | Hungerford | 264/37 |

Primary Examiner—Jay H. Woo
Assistant Examiner—James C. Housel
Attorney, Agent, or Firm—A. W. Umphlett

[57] ABSTRACT

A process for preparing thermoplastic piping for recovery of the thermoplastic in which the piping is cut into a continuous spiral ribbon with straightening of this ribbon to be without substantial curvature and cutting of the straightened ribbon into pieces. Preferably, the process produces pieces of thermoplastic of sufficiently small size to be suitable for feeding to an extruder. An apparatus for preparing thermoplastic piping for recovery of the thermoplastic which combines means for cutting the thermoplastic piping into a continuous spiral ribbon with means for straightening the spiral ribbon so that it is without substantial curvature and means for cutting the straightened ribbon into pieces.

3 Claims, 3 Drawing Figures

METHOD FOR THE RECOVERY OF THERMOPLASTIC FROM PIPING FOR REPROCESSING

This application is a divisional application of my co-pending application, Ser. No. 281,755, filed July 9, 1981, now U.S. Pat. No. 4,408,976.

BACKGROUND OF THE INVENTION

This invention relates to the recovery of thermoplastic that has been manufactured into plastic piping. In one of its aspects, this invention relates to reducing thick-walled, large diameter plastic piping into a continuous, thermoplastic ribbon. In another of its aspects, this invention relates to relieving the plastic memory from an elongated piece of thermoplastic. In another of its aspects, this invention relates to the comminution of thermoplastic piping.

It is well known to extrude thermoplastic piping that has the internal diameter of 48 inches or more which has side walls of thicknesses as great as 1½ or 2 inches. As in every manufacturing process, in the natural course of events, sufficient scrap and off-specification, extruded piping is produced to warrant a recovery of the thermoplastic for reprocessing. Unfortunately, because side walls are progressively thickened as the diameter of the extruded pipe is increased, thermoplastic piping having a diameter greater than 6 inches becomes progressively more difficult to reprocess to the granular form necessary for proper mixing and reworking as an extruder feed.

Some of the presently used methods for preparing larger diameter pipe for reprocessing require excessive amounts of manual labor in crosscutting and re-crosscutting sections of piping until pieces small enough to be easily handled by the normal comminuting equipment are attained.

It is therefore an object of this invention to provide a process for preparing thermoplastic piping for reprocessing. It is another object of this invention to provide a combination of equipment for preparing thermoplastic piping for reprocessing. It is another object of this invention to provide method and apparatus for obtaining from thick-walled large diameter thermoplastic piping pieces of thermoplastic of sufficiently small size as to be easily processed in an extruder.

Other aspects, objects, and the various advantages of this invention will become apparent upon studying this disclosure, the drawing, and the appended claims.

STATEMENT OF THE INVENTION

According to this invention a process is provided for preparing thermoplastic piping for recovery of the thermoplastic by reprocessing in which the following steps are carried out: (a) the thermoplastic pipe is cut into a continuous spiral ribbon; (b) the spiral ribbon is straightened sufficiently to produce a continuous ribbon of thermoplastic that is, at least temporarily, without substantial curvature; and (c) the straightened ribbon of thermoplastic is cut into pieces.

In an embodiment of the invention an apparatus is provided for preparing thermoplastic piping for recovery of the thermoplastic by reprocessing in which there is combined: (a) means for cutting the thermoplastic pipe into a continuous spiral ribbon; (b) means for straightening the continuous spiral ribbon into a continuous ribbon of plastic, at least temporarily, without substantial curvature; and (c) means for cutting the straightened ribbon into pieces.

In the process, and using the apparatus, of this invention the straightening of the continuous spiral ribbon is a short-lived relieving of the plastic memory of the continuous spiral ribbon that allows the straightened ribbon to be passed into a chopping device that reduces the ribbon to pieces of, at least, a size that will not deleteriously affect further handling by comminuting equipment by the return of the curvature to the thermoplastic scrap. Ideally, while the plastic memory is relieved the straightened ribbon is passed directly into equipment that can reduce the ribbon to granular size that is easily handled by extrusion equipment.

The process of this invention is applicable to piping manufactured from any thermoplastic material that is suitable for reprocessing by any means for reusing the material. The invention is particularly applicable for reprocessing thermoplastic material by extrusion.

In the process of the invention any apparatus can be used for producing the continuous spiral ribbon of thermoplastic by cutting the sidewalls of the piping. The presently preferred apparatus which can be used in demonstrating the operability of the invention will be described in conjunction with the drawing.

Similarly, the invention embraces any means for sufficiently relieving the plastic memory of the spiral ribbon cut from the sidewalls of the plastic pipe to facilitate the cutting of the ribbon into pieces. The apparatus presently preferred is a combination of three rollers placed so that the spiral ribbon is squeezed between two of the rollers both of which rotate in a direction to forward the ribbon between them and a third roller placed so that the ribbon is again pressed between the rollers at a point on the roller against which the convex side of the ribbon was originally pressed that is about 30 to about 60 degrees removed from the point of contact with the first set of rollers. The rollers making up the second pair also both rotate in a direction to forward the ribbon between them. The preferred apparatus will be further described in conjunction with the drawing.

Means useful for cutting the straightened ribbon into pieces or comminuting the ribbon can be chosen from any of the well known commercial devices used for that purpose. Among such devices are Nelmor Model G2436M1 manufactured by a Division of Application Engineering Corp. of Farmington Hills, Mich.

Figure 2:
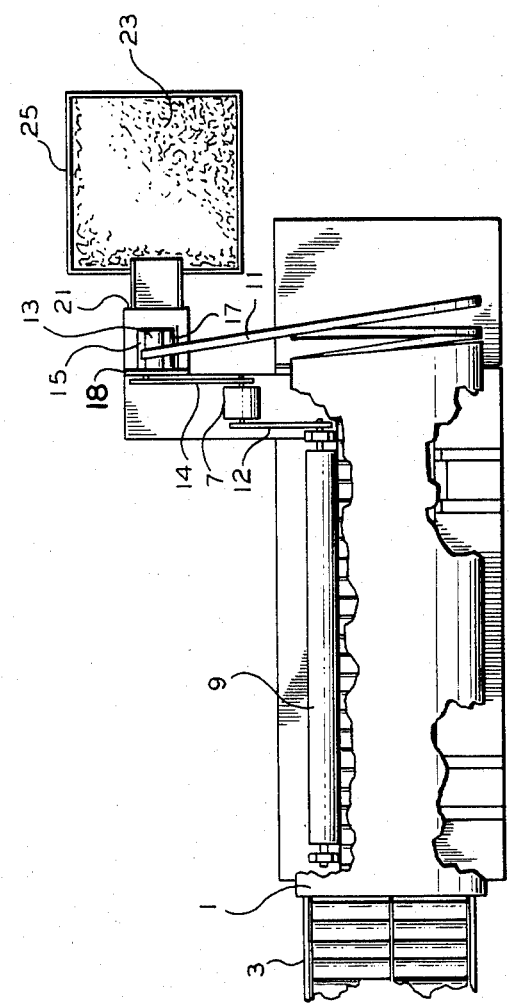
Figure 3:
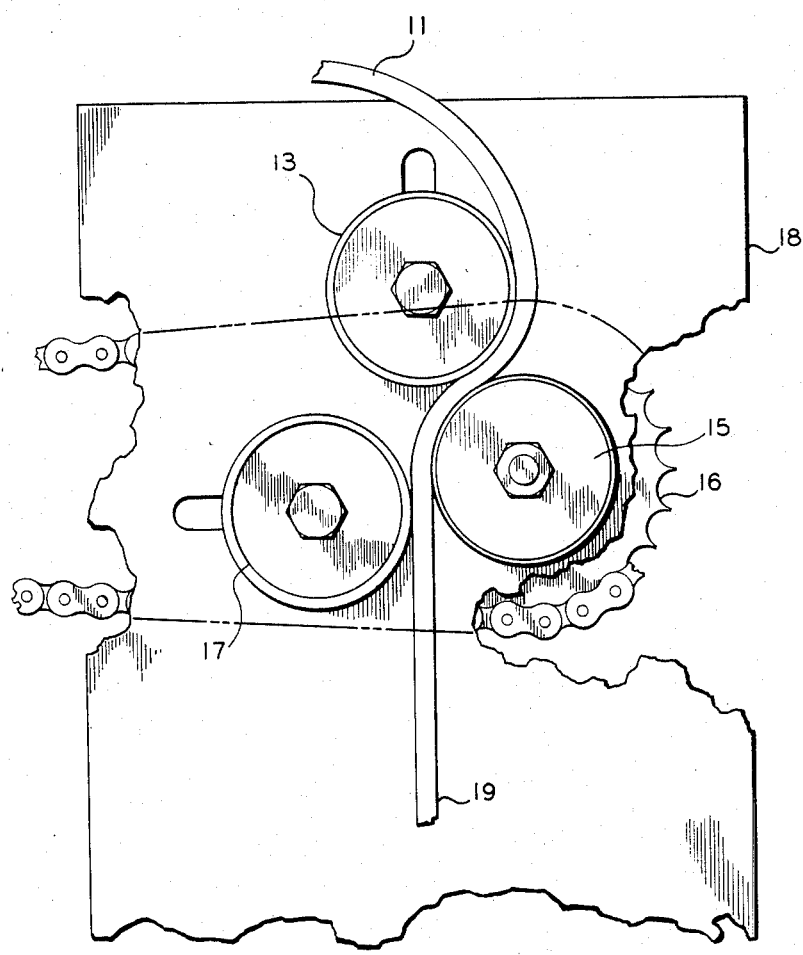

The invention can best be understood in conjunction with the drawing in which FIG. 1 is a pictorial view of a preferred means for producing the spiral ribbon with an indication of the preferred means of straightening and cutting the ribbon, FIG. 2 is an overhead view of a pipe positioned for being cut into spiral ribbon with comminution of the ribbon, and FIG. 3 is a plan view of the preferred means for straightening the ribbon.

Referring now to FIGS. 1 and 2 of the drawing, a pipe 1 having an internal diameter of 36 inches and a wall thickness of 1 inch is mounted on a conveyor 3 which is set at a small horizontal angle 4, in the range of about 0.5 to about 2 degrees between face or end of the pipe and the center line of the blade 5 of the cut-off saw so that the saw blade passes through the wall of the piping cutting a spiral of thermoplastic from the pipe. The saw blade 5 is mounted on saw means 6 and driven by electric motor means, not shown. Saw means 6 is similar to a conventional table saw having adjusting cranks 6A and 6B for adjusting depth and angle of cut as known in the art. Drive means 7 drives chain 12 and associated sprockets linked to roller 9 alligned to press on the outside of an adjacent portion of the pipe sidewall and cooperates with idler rollers 10 which rotate in opposite directions so that they act to turn the pipe into the teeth of the saw blade.

The pipe 1 is set in position on the conveyor 3 which is sloped downward towards the saw means 6 sufficiently to cause the pipe to feed forward toward the saw blade 5 or at an angle of about 0.02° to 3° and the saw blade 5 begins to cut into the sidewall, the rollers 9 and 10 continue to move the piping into the saw to produce a ribbon 11 of thermoplastic the width of which is determined by the angle described between the blade face and the pipe. The spiral ribbon 11 of thermoplastic is then caught between three rollers 13, 15 and 17. Drive means 7 also drives chain 14 and its associated sprocket 16 attached to roller 15 mounted in frame 18 to move the ribbon 11 forward. The position of rollers 13 and 17 can be adjusted to accomodate other thicknesses of ribbon and to straighten the ribbon. These rollers operate to relieve the plastic memory of the spiral ribbon and produce a straightened thermoplastic ribbon 19 which can immediately be passed through a cutting device 21, here indicated as a commercial chopper to produce pieces of thermoplastic 23, which are collected in hopper 25.

The operation of the rollers 13, 15 and 17 is best understood in conjunction with FIG. 3 in which the spiral ribbon 11 is shown passing between rollers 13 and 15 with its convex face against roller 15 and its concave face against roller 13. The rollers are positioned to press against the ribbon and roller 15 is rotated in a direction to move the ribbon forward between the rollers. The ribbon 11 is forwarded between rollers 15 and 17 with rollers 17 set to press the ribbon against roller 15 at a position between about 30 and about 60 degrees removed from the initial contact of the ribbon between rollers 13 and 15. The actions of these rollers is sufficient to relieve the plastic memory of the ribbon to produce a straightened ribbon 19 which can be passed to the cutting or chopping device 21 forming chopped pieces 23 and collected in container 25 before the plastic memory is sufficiently returned to cause problems with the cutting means 21.

Depending on the size of the pieces of plastic 23, they can immediately be mixed with other particles and reprocessed by extrusion or similar action or can be further reduced in size if desired.

I claim:

1. A process for recovery of thermoplastic from thermoplastic piping having walls sufficiently thick to be self-supporting, comprising the steps of:
   (a) cutting said piping into a continuous spiral ribbon,
   (b) straightening said continuous spiral ribbon into a continuous ribbon of thermoplastic without substantial curvature, at least temporarily relieving the plastic memory of said thermoplastic ribbon, and
   (c) cutting said straightening ribbon into pieces while said plastic ribbon is relieved of its plastic memory.

2. A process of claim 1 wherein said pieces of ribbon are reduced in size sufficiently for mixing and reprocessing in an extruder.

3. A process of claim 1 wherein said pieces of ribbon produced by the process are too large for convenient mixing and reprocessing in an extruder and are subsequently subjected to an additional comminuting operation to produce granules of sufficiently reduced sizes for mixing and reprocessing in an extruder.

* * * * *